US012802049B2

(12) United States Patent
Mincey et al.

(10) Patent No.: US 12,802,049 B2
(45) Date of Patent: Nov. 17, 2026

(54) SYSTEM AND METHOD FOR DETERMINING MATCHES IN A LIVE SPEED DATING APPLICATION

(71) Applicant: Switch Enterprises Inc., Atlanta, GA (US)

(72) Inventors: Kiana Latrelle Mincey, Atlanta, GA (US); Corey Alexandria Staples, San Diego, CA (US)

(73) Assignee: Switch Enterprises Inc., Atlanta, GA (US)

( * ) Notice: Subject to any disclaimer, the term of this patent is extended or adjusted under 35 U.S.C. 154(b) by 77 days.

(21) Appl. No.: 18/444,321

(22) Filed: Feb. 16, 2024

(65) Prior Publication Data

US 2024/0281900 A1 Aug. 22, 2024

Related U.S. Application Data

(60) Provisional application No. 63/446,227, filed on Feb. 16, 2023.

(51) Int. Cl.
*G06Q 10/42* (2026.01)

(52) U.S. Cl.
CPC .................................... *G06Q 10/42* (2026.01)

(58) Field of Classification Search
CPC ............................... G06Q 50/01; G06Q 10/42
See application file for complete search history.

(56) References Cited

U.S. PATENT DOCUMENTS

| | | | |
|---|---|---|---|
| 2007/0066353 A1 | 3/2007 | Silverbrook et al. | |
| 2007/0073802 A1 | 3/2007 | Terrill et al. | |
| 2009/0306981 A1 | 12/2009 | Cromack et al. | |
| 2011/0252340 A1 | 10/2011 | Thomas | |
| 2014/0171046 A1 | 6/2014 | Mullen | |
| 2017/0006258 A1* | 1/2017 | Farrell | G06V 40/70 |
| 2020/0104943 A1* | 4/2020 | Page-Romer | G06Q 10/107 |
| 2022/0351730 A1* | 11/2022 | Yang | G10L 25/30 |

OTHER PUBLICATIONS

Roberta Tassi, Eradicating Algorithmic Blackboxing in Dating Apps: The Road to Transparency and Better Connections, 2021 (Year: 2021).*

International Search Report and Written Opinion, dated May 31, 2024, issued in corresponding International Application No. PCT/US24/16271, filed Feb. 16, 2024.

* cited by examiner

*Primary Examiner* — Ismail A Manejwala
(74) *Attorney, Agent, or Firm* — Knobbe, Martens, Olson & Bear, LLP

(57) ABSTRACT

The present invention generally relates to a live audio speed dating application. Specifically, the present invention relates to a live audio speed dating application with a unique way of determining matches. A plurality of algorithms are employed to determine matches, including a base matching algorithm, a 1:1 request algorithm, and a roulette algorithm. The speed dating application has both audio and text chat functionality and use conversation drivers to facilitate interaction between users. An intuitive AI tracks a user's actions in the dating application to further refine its matching proficiency.

8 Claims, 9 Drawing Sheets

FIG. 5
Likes
1:1 Requests
James, 27
1:1 Speed-date
Leave
James
1:1 Speed-date
Leave
James
1:1 Speed-date
Leave
James
If you had to choose a place to live, what would it be?

SYSTEM AND METHOD FOR DETERMINING MATCHES IN A LIVE SPEED DATING APPLICATION

RELATED APPLICATIONS

This application claims the benefit of U.S. Provisional Patent Application No. 63/446,227 filed Feb. 16, 2023, which is hereby incorporated by reference in its entirety.

FIELD OF THE INVENTION

The present invention generally relates to online dating. Specifically, the present invention relates to a live audio speed dating application with a unique way of determining matches and facilitating interactions.

BACKGROUND

Dating has evolved significantly in recent years, transitioning from traditional methods to digital platforms. The emergence of dating applications has revolutionized how individuals connect, communicate, and form relationships. These applications offer users the opportunity to explore potential matches conveniently, often based on predetermined criteria such as age, location, interests, and hobbies.

Despite the proliferation of dating apps, there remains a significant gap in the market concerning real-time audio speed dating functionality. While existing platforms facilitate text-based communication, none effectively offer the experience of rapid-fire, live conversation (via video or audio means) interactions that simulate real-life speed dating events.

Speed dating has long been recognized as an effective method for individuals to meet and assess potential partners quickly. However, the logistical challenges of organizing in-person events, coupled with the constraints of physical location, have limited broader adoption. Additionally, traditional speed dating events often lack the ability to cater to specific preferences and criteria that users may have, resulting in a less personalized experience.

Existing dating applications primarily focus on asynchronous communication, wherein users exchange messages over extended periods, often leading to delays in establishing meaningful connections.

Furthermore, current dating apps often rely on very limited matching based on user-provided information and preferences, such as age and gender preferences. While these matching algorithms can be effective to a certain extent, they may overlook nuanced aspects of compatibility that become apparent through direct, real-time interactions.

In light of these deficiencies in the current landscape of dating applications, there exists a clear need for a novel solution that integrates the principles of real-time audio speed dating with the convenience and accessibility of digital platforms. Such a solution would provide users with a unique and engaging way to meet potential partners while addressing the limitations of existing dating apps.

The present invention aims to fulfill this need by providing a dating software application that enables users to participate in real-time speed dating sessions, wherein matches are made based on predetermined criteria provided in user profiles. By combining the spontaneity of face-to-face interactions with the efficiency of digital communication, the invention offers a novel and effective approach to online dating.

SUMMARY OF THE INVENTION

According to an embodiment of the present invention, a computerized method for determining and providing matches while facilitating interaction between users in an online dating application is detailed herein. The method comprises: receiving a request from a first user to match with one or more other users, wherein said request comprises data related to the first user about one or more data points the first user is interested in that match data provided by the one or more other users; generating one or more matches between first user and said one or more other users, wherein the one or matches are based at least in part on the data related to the first user and the data provided by the one or more other users; receiving approval to match from the first user and a matched user selected from the one or more other users; generating one or more icebreaker contents, wherein each one of the one or more icebreaker contents is based at least in part on matching data points between the data related to the first user and the data provided by the matched user; and initiating a real-time connection between the first user and the matched user.

According to an embodiment of the present invention, the method further comprises the step of providing to the first user and matched user an option to extend duration of the real-time connection between the first user and the matched user.

According to an embodiment of the present invention, the method further comprises the step of extending the duration of the real-time connection between the first user and matched user based on input received from the first user and matched user.

According to an embodiment of the present invention, the method further comprises the steps of: analyzing audio data related to a conversation between the first user and matched user; and identifying at least one of the first user and matched user based on analysis of said audio data.

According to an embodiment of the present invention, the method further comprises the step of identifying more or more voice tones associated with the audio data.

According to an embodiment of the present invention, the method further comprises the step of executing an action based on said one or more voice tones associated with the audio data. According to an embodiment of the present invention, the action is selected from the group comprising terminating the real-time connection, extending the real-time connection, and providing audio or visual indicators to one or more of the first user and matched user.

According to an embodiment of the present invention, the method further comprises the step of providing additional information to the first user and matched user based on approval by both first user and matched user to do so.

According to an embodiment of the present invention, a computerized system for determining and providing matches while facilitating interaction between users in an online dating application is detailed herein. In certain embodiments the system comprises: one or more hardware processors configured by machine readable instructions to: receive a request from a first user to match with one or more other users, wherein said request comprises data related to the first user about one or more data points the first user is interested in that match data provided by the one or more other users; generate one or more matches between first user and said one or more other users, wherein the one or matches are based at least in part on the data related to the first user and the data provided by the one or more other users; receiving approval to match from the first user and a matched user selected from the one or more other users; generate one or more icebreaker contents, wherein each one of the one or more icebreaker contents is based at least in part on matching data points between the data related to the first user and the data provided by the matched user; and initiate a real-time connection between the first user and the matched user.

According to an embodiment of the present invention, the one or more hardware processors are further configured by machine readable instructions to provide to the first user and matched user an option to extend duration of the real-time connection between the first user and the matched user.

According to an embodiment of the present invention, the one or more hardware processors are further configured by machine readable instructions to extend the duration of the real-time connection between the first user and matched user based on input received from the first user and matched user.

According to an embodiment of the present invention, the one or more hardware processors are further configured by machine readable instructions to: analyze audio data related to a conversation between the first user and matched user; and identify at least one of the first user and matched user based on analysis of said audio data.

According to an embodiment of the present invention, the one or more hardware processors are further configured by machine readable instructions to identify more or more voice tones associated with the audio data.

According to an embodiment of the present invention, the one or more hardware processors are further configured by machine readable instructions to execute an action based on said one or more voice tones associated with the audio data, wherein the action is selected from the group comprising terminating the real-time connection, extending the real-time connection, and providing audio or visual indicators to one or more of the first user and matched user.

According to an embodiment of the present invention, the one or more hardware processors are further configured by machine readable instructions to provide additional information to the first user and matched user based on approval by both first user and matched user to do so.

DETAILED SPECIFICATION

The present invention generally relates to systems and methods for online dating. Specifically, the present invention relates to a live audio speed dating application with a unique way of determining matches and facilitating interactions.

Figure 1:
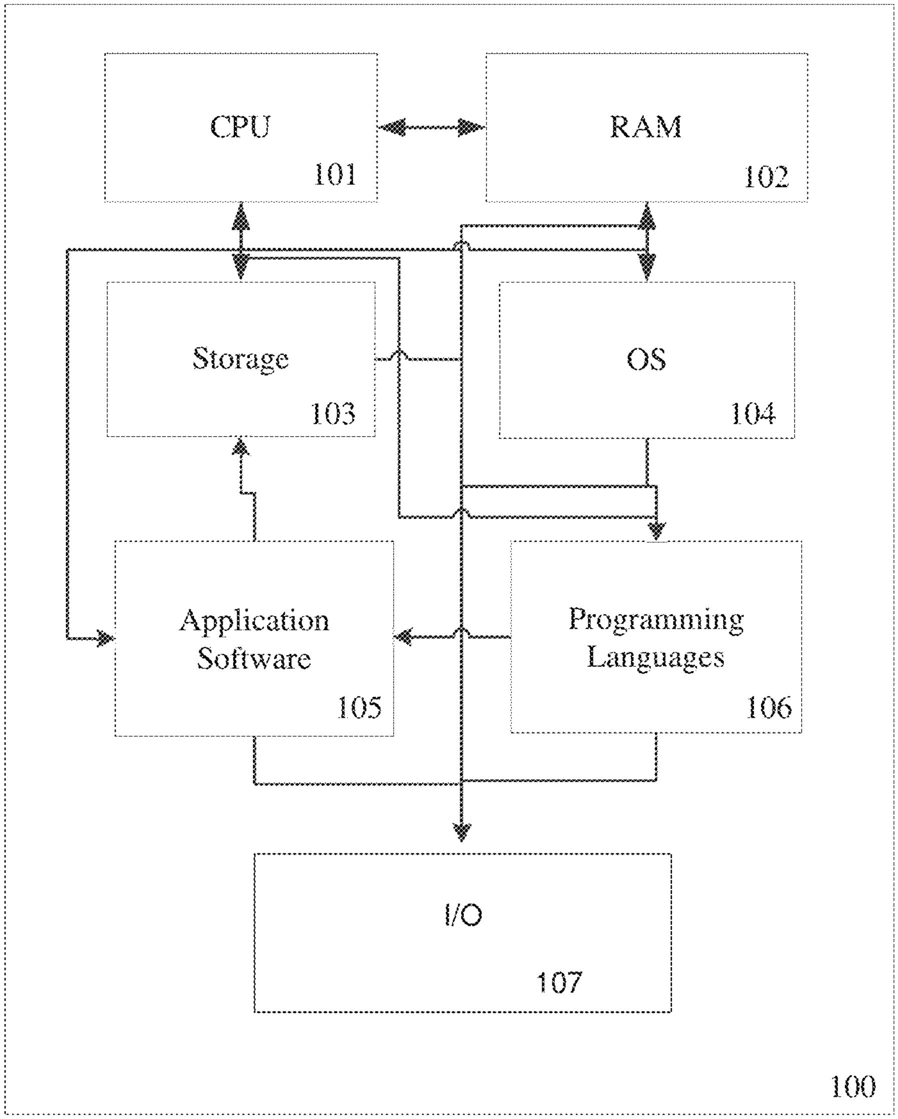
FIG. 1 illustrates a schematic overview of a computing device, in accordance with an embodiment of the present invention.

According to an embodiment of the present invention, the system and method is accomplished through the use of one or more computing devices. As shown in FIG. 1, One of ordinary skill in the art would appreciate that a computing device 100 appropriate for use with embodiments of the present application may generally be comprised of one or more of a Central processing Unit (CPU) 101, Random Access Memory (RAM) 102, and a storage medium (e.g., hard disk drive, solid state drive, flash memory) 103. Examples of computing devices usable with embodiments of the present invention include, but are not limited to, personal computers, smart phones, laptops, mobile computing devices, tablet PCs and servers. The term computing device may also describe two or more computing devices communicatively linked in a manner as to distribute and share one or more resources, such as clustered computing devices and server banks/farms. One of ordinary skill in the art would understand that any number of computing devices could be used, and embodiments of the present invention are contemplated for use with any computing device.

In an exemplary embodiment according to the present invention, data may be provided to the system, stored by the system and provided by the system to users of the system across local area networks (LANs) (e.g., office networks, home networks) or wide area networks (WANs) (e.g., the Internet). In accordance with the previous embodiment, the system may be comprised of numerous servers communicatively connected across one or more LANs and/or WANs. One of ordinary skill in the art would appreciate that there are numerous manners in which the system could be configured and embodiments of the present invention are contemplated for use with any configuration.

In general, the system and methods provided herein may be consumed by a user of a computing device whether connected to a network or not. According to an embodiment of the present invention, some of the applications of the present invention may not be accessible when not connected to a network, however a user may be able to compose data offline that will be consumed by the system when the user is later connected to a network.

Figure 2:
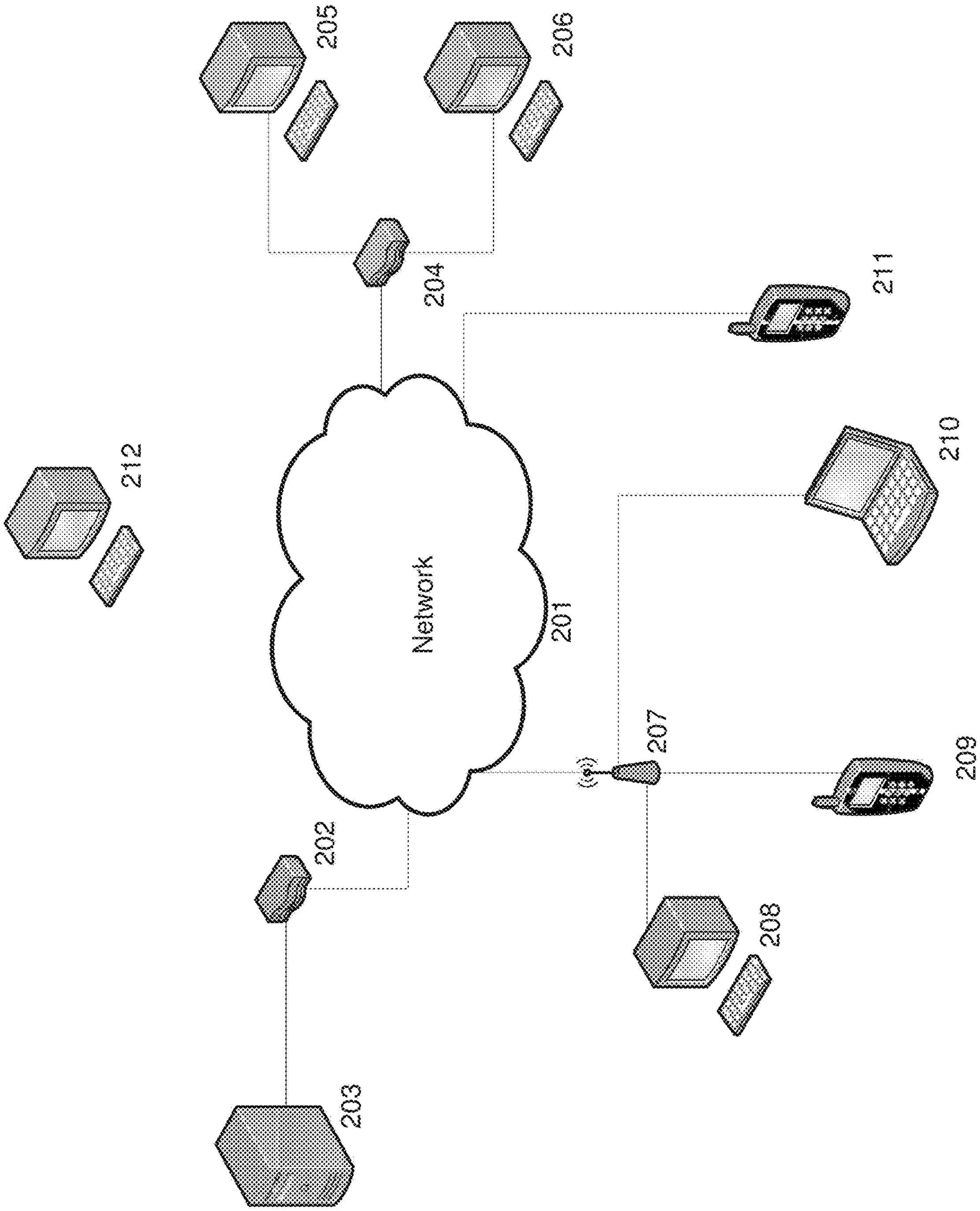
FIG. 2 illustrates a network schematic of a system, in accordance with an embodiment of the present invention.

Referring to FIG. 2, a schematic overview of a system in accordance with an embodiment of the present invention is shown. The system is comprised of one or more application servers 203 for electronically storing information used by the system. Applications in the server 203 may retrieve and manipulate information in storage devices and exchange information through a WAN 201 (e.g., the Internet). Applications in server 203 may also be used to manipulate information stored remotely and process and analyze data stored remotely across a WAN 201 (e.g., the Internet).

According to an exemplary embodiment, as shown in FIG. 2, exchange of information through the WAN 201 or other network may occur through one or more high speed connections. In some cases, high speed connections may be over-the-air (OTA), passed through networked systems, directly connected to one or more WANs 201 or directed through one or more routers 202. Router(s) 202 are completely optional and other embodiments in accordance with the resent invention may or may not utilize one or more routers 202. One of ordinary skill in the art would appreciate that there are numerous ways server 203 may connect to WAN 201 for the exchange of information, and embodiments of the present invention are contemplated for use with any method for connecting to networks for the purpose of exchanging information. Further, while this application refers to high speed connections, embodiments of the present invention may be utilized with connections of any speed.

Components of the system may connect to server 203 via WAN 201 or other network in numerous ways. For instance, a component may connect to the system: i) through a computing device 212 directly connected to the WAN 201, ii) through a computing device 205, 206 connected to the WAN 201 through a routing device 204, iii) through a computing device 208, 209, 210 connected to a wireless access point 207 or iv) through a computing device 211 via a wireless connection (e.g., CDMA, GMS, 3G, 4G, 5G) to the WAN 201. One of ordinary skill in the art would appreciate that there are numerous ways that a component may connect to server 203 via WAN 201 or other network, and embodiments of the present invention are contemplated for use with any method for connecting to server 203 via WAN 201 or other network. Furthermore, server 203 could be comprised of a personal computing device, such as a smartphone, acting as a host for other computing devices to connect to.

Figure 3:
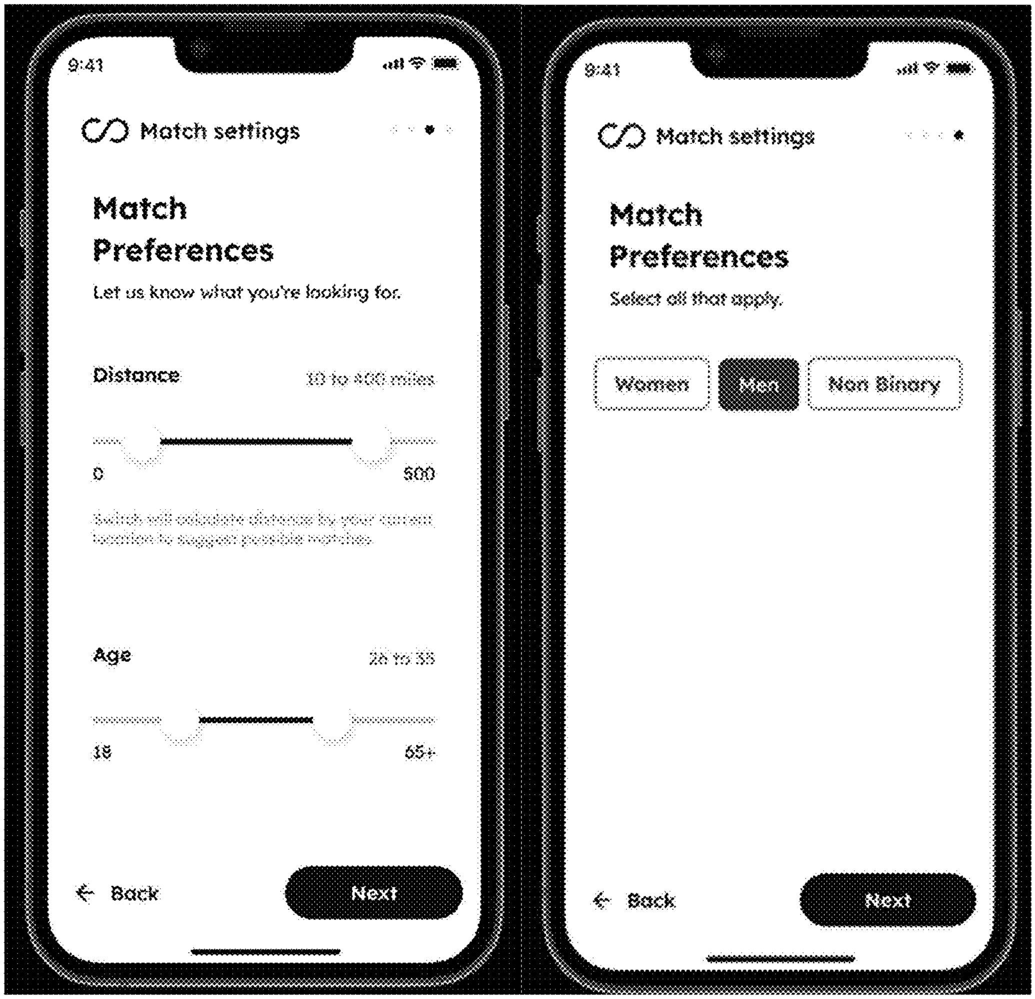
FIG. 3 is a schematic view of an exemplary embodiment of the present invention.

Embodiments of the present invention provide systems and methods for matching users of an online dating application ("matching app" or "app" hereinafter). The app employs several different algorithms that are used for matching users. A Base Matching Algorithm matches users based on specific preference variables configurable by way of the user selecting matching preferences inside the app as shown in FIG. 3, such as: gender, location (i.e., geolocation), and age. The algorithm uses two-way logic that compares user preferences and creates mutual matches when the algorithm identifies matching preference variables. For example, if User A, who is a man aged 35, has the following preferences:

Looking for a Woman (Gender)
Located 100 miles away (Location)
Between 21 and 31 years old (Age)

And User B, who is a Woman aged 25, has the following preferences:

Looking for a Man (Gender)
Located 100 miles away (Location)
Between 30 and 40 years old (Age)

The algorithm would match them, in this example, as they have commonly chosen variables.

Figure 4:
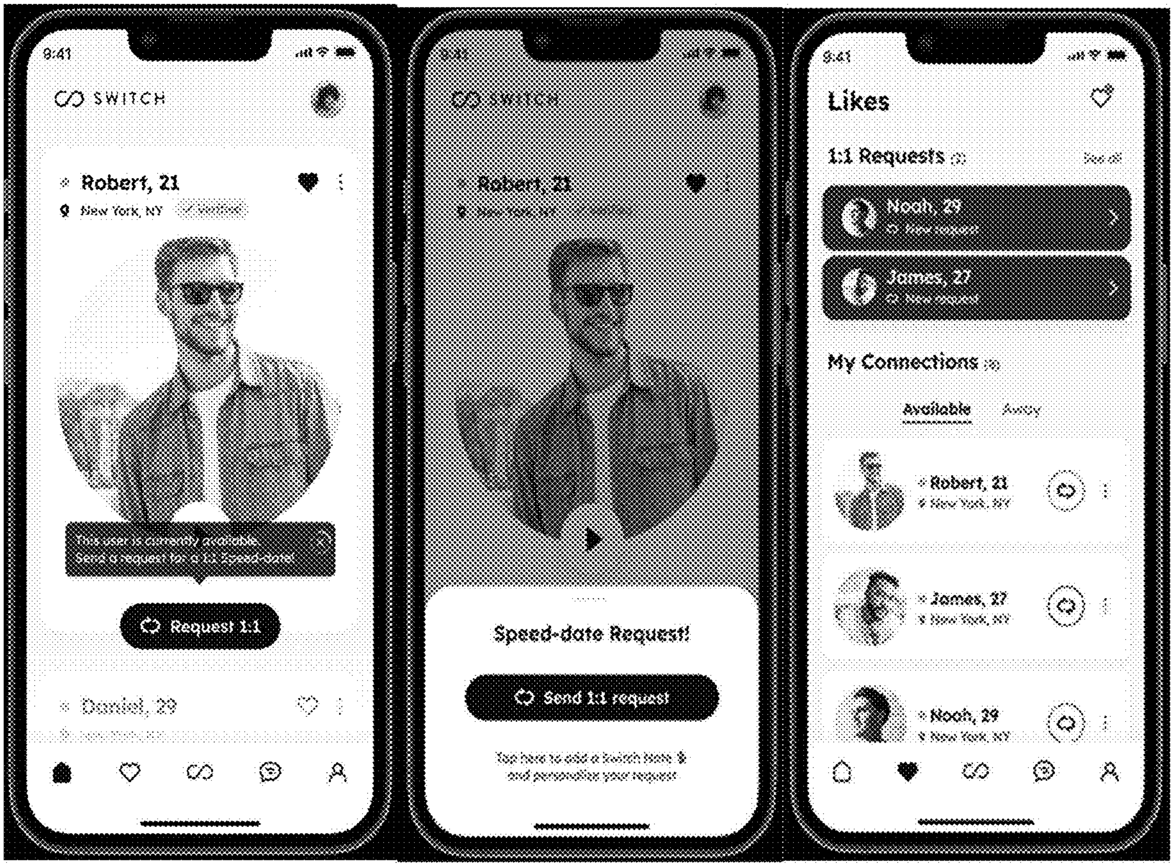
FIG. 4 is a schematic view of an exemplary embodiment of the present invention.

According to embodiments of the present invention, a 1:1 Request Algorithm is used to match users of the dating app without requiring mutual action by the respective users. For example, if the algorithm determines that User A likes User B based on User A's inputted preferences from a home screen feed, and User B likes User A based on User B's inputted preferences from a home screen feed, a 1:1 Request can be initiated by the system. In other embodiments, where the system determines that User A likes User B, but User B would not necessarily match with User A, a 1:1 Request can still proceed under certain settings. For instance, User A can still send a request, such as a speed dating request, to user B as shown in exemplary FIG. 4. However, one of ordinary skill in the art will appreciate that in certain embodiments, mutual likes (e.g., user A and B's mutual preferences are met by each other) may be required for a user to initiate a request. In certain embodiments, in instances where users were not matched by the system, but rather each of the two users individually liked a profile or submitted a speed dating request to each other, the system may be configured to determine when both individuals are online and available for a 1:1 request, for example when the initial 1:1 request from the sending user was not accepted by the receiving user because the receiving user did not accept or was offline, and engage that request when that triggering event occurs.

In preferred embodiments of the present invention, the system may be configured to generate and/or provide "ice-breaker" questions or other content (e.g., identified similarities or common interests, topical or newsworthy events User A and User B may mutually share interest in, information about upcoming events in the area) to drive conversation between users. One of ordinary skill in the art would appreciate there are numerous types of ice-breaker questions and other content that could be utilized, and embodiments of the present invention are contemplated for use with any type of appropriate or relevant content. These ice-breaker questions or other content aid in keeping discussions or other communications between User A and User B fluid and interesting.

Figure 5:
FIG. 5 is a schematic view of an exemplary embodiment of the present invention.

According to an embodiment of the present invention shown in exemplary FIG. 5, the match app features a private audio call feature (i.e., 1:1 audio conversations). This feature allows two users to access a common digital space, such as a chat room with audio functionality, and engage in an audio conversation for a predetermined time, such as 3 minutes, driven by conversation drivers that the user can choose. For example, User A requests a 1:1 conversation with User B. Thereafter, User A and User B enter a 1:1 conversation space where they can interact inside the room through an audio conversation for a specified amount of time (e.g., 3 minutes). During the audio call, the participants (e.g., Users A and B) can freely choose system provided conversation drivers that can help facilitate an engaging conversation or simply discuss without the conversation drivers. Conversation drivers may be auto-generated by the system, provided by administrators, or even uploaded by users and analyzed for appropriateness. Other means of adding conversation drivers include allowing advertisers or other third-party service provider.

In certain embodiments, the system may be configured to all User A and User B to extend the time of a 1:1 conversation. In a preferred embodiment, the system may be configured to provide both User A and User B a prompt to extend the time of the conversation. If both User A and User B select to extend the time, then additional time will be added to the call. If either User A or User B does not select to extend the time, the call will not extend. In certain embodiments, Users A and User B may be given multiple options to extend the time of the call.

Figure 6:
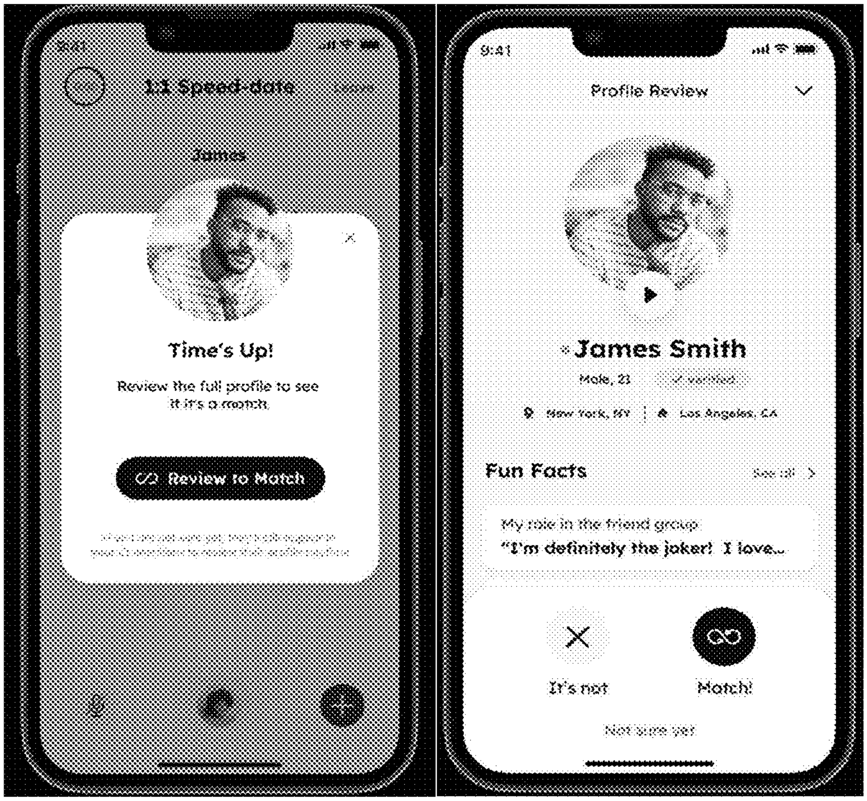
FIG. 6 is a schematic view of an exemplary embodiment of the present invention.

After the 1:1 conversation is over, whether an extension was provided or not, each user can decide if they are a match or not. If they both do, they can access a chat room inside the app where they can continue the conversation as shown in exemplary FIG. 6.

Figure 7:
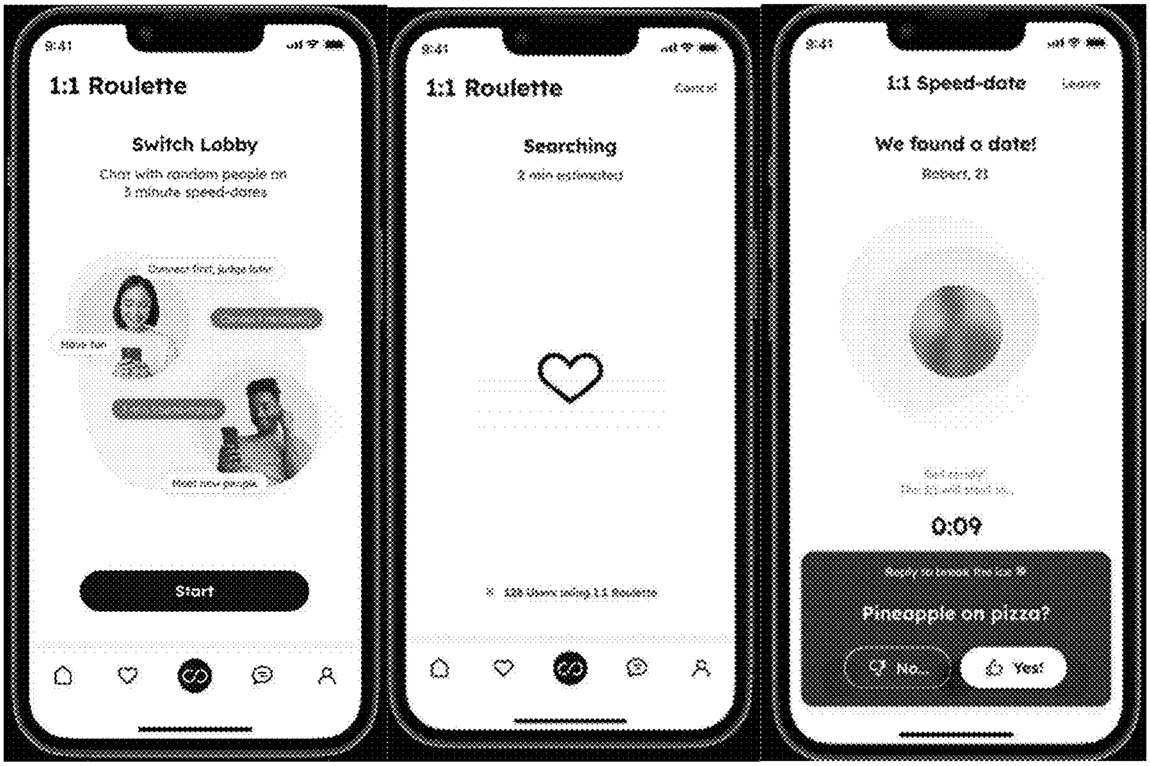
FIG. 7 is a schematic view of an exemplary embodiment of the present invention.

According to an embodiment of the present invention shown in exemplary FIG. 7, a 1:1 Roulette Algorithm searches for random matching users is shown. In certain embodiments, the algorithm may require two-way matching of two users based on the preferences known by the system. In other embodiments, the system may be configured to match users based on a subset of preferences (e.g., age and gender), allowing for a broader array of potential matches. Therefore, if a user is a 'Man' and sets his preferred match's gender to be only 'Women', only users whose gender is 'Woman' and their preferred match's gender is 'Men' should appear in the user's Roulette Algorithm match results. In this embodiment, a user can also see how many users are using the 1:1 roulette option in the matching app. In preferred embodiments, the system will provide users the ability to leave the Roulette Algorithm or other functionality of the system at any time.

According to a preferred embodiment of the present invention, once the 1:1 roulette finds a potential match, both users will be redirected to an icebreaker or other content user interface to interact with that content and then the speed-date may commence.

According to another embodiment of the present invention, the matching app may be configured to recommend matches based on a user's prior choices. Specifically, the base matching algorithm may be configured to identify choice patterns based on actions taken by the user. For example, the matching app can determine who the user liked the most, and use the variables associated with the liked members to find future matches. Other factors that may be considered in finding matches include which other members the user get into a 1:1 conversation; and which member(s) did the user match after having one or more 1:1 conversations. The matching app can then use variables, such as selected conversation drivers, used during the 1:1 conversation, to make matching recommendations.

In addition, the matching app may be configured to use branded conversation drivers, i.e., conversation drivers created by a brand or for a brand. These branded conversation drivers not only help facilitate conversation between users they also promote a particular brand as part of a matching recommendation.

According to another embodiment, matching recommendations can be made based on voice tones used in 1:1 conversation. The matching app uses AI (artificial intelligence) that recognizes voice tones, gathers data, and draws patterns that can further refine user's choices and improve existing algorithms. Recognizing expressions such as laughs, raised voices, and tension can help determine whether to continue a social/dating interaction or end the interaction in the interest of safety.

According to another embodiment, the matching app includes an intuitive AI (artificial intelligence) that can predict who a user would want to speed date with based on the conversation drivers the user selected during past speed dates. Specifically, a user engaging in a matching app generated virtual speed date can select a conversation driver from a conversation driver menu provided in the virtual speed dating environment. For example, a user can select a conversation driver from selectable menu driven categories such as life, movies, sports, random, music, or branded. Once a category is selected, the matching app displays a random question from the selected category to help facilitate conversation related to the random question. The AI then tracks which conversation driver categories the user selected and can use the user's past selected categories to help find a suitable match.

The AI is further able to analyze a user's voice to determine potential dating matches. For example, the AI is configured to analyze a user's voice notes to another user, including octave, pitch, volume, region, dialect, language, words, etc. to determine dating preferences. The AI then populates the potential dating matches from most to least likely to engage with the user based on the voice notes. In addition, the AI can track other user actions such as whether the user extended a speed date to determine user dating preferences.

Figure 8:
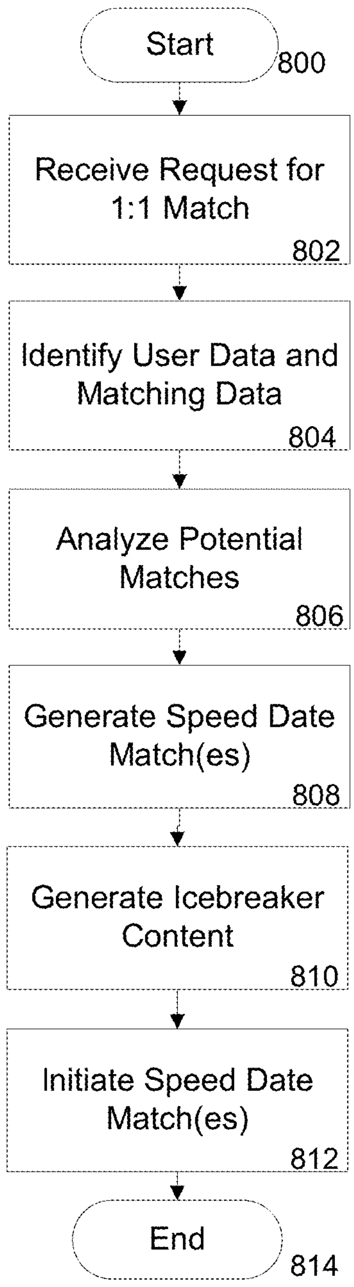
FIG. 8 is an illustration of an exemplary method for determining matches in a live audio speed dating application, in accordance with an embodiment of the present invention.

Turning now to FIG. 8, an exemplary method for providing system based live speed dating is shown, in accordance with an embodiment of the present invention. At step 800, the process begins with the system receiving a request from a user to match with one or more other users for the purpose of engaging in 1:1 speed dating matching. At Step 802, the system receives the request and begins to process the data contained in the request.

At step 804, the system retrieves information related to the user submitting the request and retrieves information about other users that could potentially match with the initiating user, based on information the system has stored related to the user, or is otherwise provided by the user. As discussed elsewhere herein, the information about the user and other potentially matching users may include various data points and information.

At step 806, the system identifies potential matches for the initiating user, based at least in part on the data provided and/or stored by the system related to the initiating user and the potential matching users. Given the speed dating is intended to be a real-time activity, the system may be configured to only include potential matches that are actively available for 1:1 matching. In other embodiments, alerts may be sent to otherwise offline users that they have a potential match for 1:1 real-time matching.

At step 808, the system generates and provides to the initiating user and other users the potential matches. The users then determine if they want to do a 1:1 real-time match. In certain embodiments, these may be done in real-time or they may alternatively be scheduled for a specific time when both users are available. In still further embodiments, the system may provide a set schedule of time, like would be found in a speed dating event (e.g., 8-10 PM), and 1:1 real-time matches may occur during that window with any and/or all matches the user has made prior to the event.

At step 810, the system generates potential icebreaker and/or other content for potential discussions between the matched users. This content may be provided to the user prior to initiating a 1:1 real-time match, or as part of the 1:1 real time match process. In certain embodiments, particularly where the 1:1 real time match is going to occur at a scheduled later time, the icebreaker content can be used to build report between users before the actual 1:1 real-time match.

At step 812, the system provides the 1:1 real-time match/speed date. The system would be configured to provide the technological back-end and communications between the users, whether it be audio only, multimedia or otherwise. Timing and other features of the 1:1 real time matching is detailed elsewhere herein. At the conclusion of the match, the users can determine whether they wish to continue communicating off of the platform (or on the platform) and the process terminates at step 314.

Figure 9:
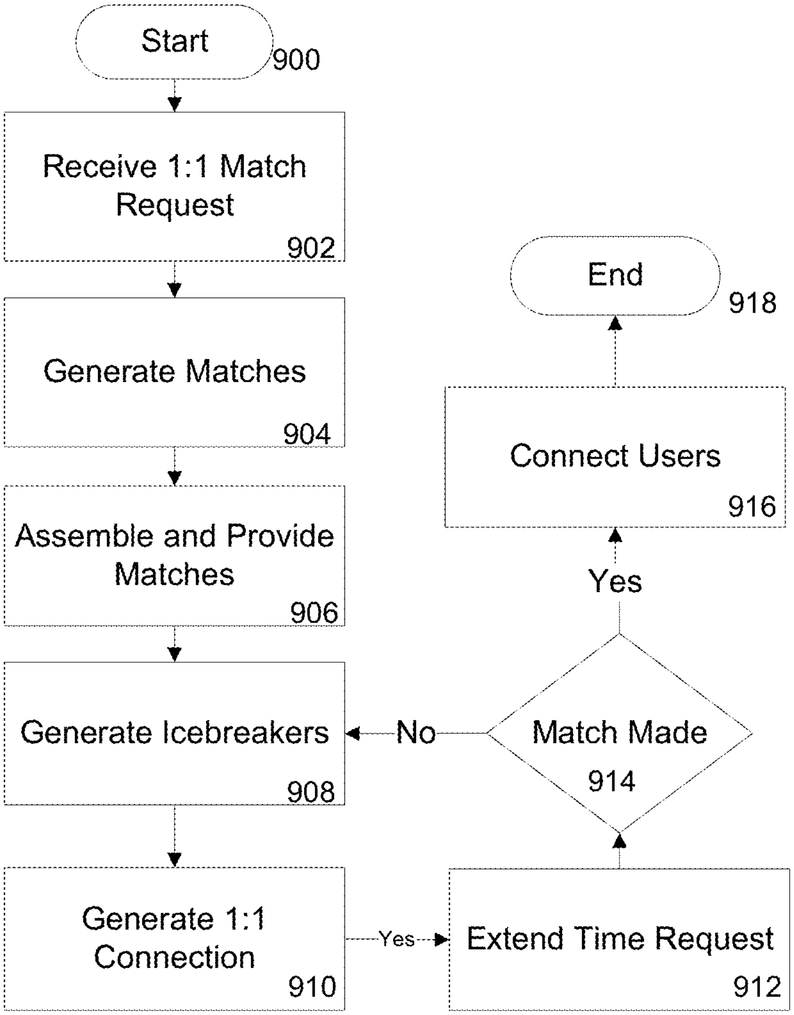
FIG. 9 is an illustration of an exemplary method for determining matches in a live audio speed dating application, in accordance with an embodiment of the present invention.

Turning now to FIG. 9, an exemplary method for providing system based live speed dating is shown, in accordance with an embodiment of the present invention. At step 900, the process begins with the system receiving a request from a user to match with one or more other users for the purpose of engaging in 1:1 speed dating matching. At Step 902, the system receives the request and begins to process the data contained in the request.

At step 904, the system generates potential matches for the initiating user. As noted elsewhere herein, the matching is based on a multifactor analysis, and may be conducted as detailed elsewhere herein. In preferred embodiments, the system leverages AI/ML and predictive analytics means based on data previously provided and aggregated in the system to enhance the outcome of results.

At step 906, the system provides a set of potential matches to the users for the users to select from. Once the users have provided the selection of what other users they want to connect with, the system generates the matched pairs for connections.

At step 908, the system generates the icebreaker and other content for the potential user matches. As detailed elsewhere herein, the system may provide this content prior to the real-time 1:1 matching event, or for use in the 1:1 matching event.

When the users are ready to initiate, the process moves to step 910, and the system generates the real-time 1:1 connection between the users. At step 912, the users may be provided the ability to extend the time of their 1:1 connection.

At step 914, the system will provide means for the users to determine whether they wish to continue to communicate after the 1:1 connection is completed. If both users do, the system will connect the users and provide means for them to communicate further, or otherwise provide contact information for the users to one another. At this point the process will terminate.

If the users do not connect at step 914, the system may be configured to loop back through and offer the users the ability to connect with other users they have matched with and the process will continue back through step 908.

Traditionally, a computer program consists of a finite sequence of computational instructions or program instructions. It will be appreciated that a programmable apparatus (i.e., computing device) can receive such a computer program and, by processing the computational instructions thereof, produce a further technical effect.

A programmable apparatus includes one or more microprocessors, microcontrollers, embedded microcontrollers, programmable digital signal processors, programmable devices, programmable gate arrays, programmable array logic, memory devices, application specific integrated circuits, or the like, which can be suitably employed or configured to process computer program instructions, execute computer logic, store computer data, and so on. Throughout this disclosure and elsewhere a computer can include any and all suitable combinations of at least one general purpose computer, special-purpose computer, programmable data processing apparatus, processor, processor architecture, and so on.

It will be understood that a computer can include a computer-readable storage medium and that this medium may be internal or external, removable and replaceable, or fixed. It will also be understood that a computer can include a Basic Input/Output System (BIOS), firmware, an operating system, a database, or the like that can include, interface with, or support the software and hardware described herein.

Embodiments of the system as described herein are not limited to applications involving conventional computer programs or programmable apparatuses that run them. It is contemplated, for example, that embodiments of the invention as claimed herein could include an optical computer, quantum computer, analog computer, or the like.

Regardless of the type of computer program or computer involved, a computer program can be loaded onto a computer to produce a particular machine that can perform any and all of the depicted functions. This particular machine provides a means for carrying out any and all of the depicted functions.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Computer program instructions can be stored in a computer-readable memory capable of directing a computer or other programmable data processing apparatus to function in a particular manner. The instructions stored in the computer-readable memory constitute an article of manufacture including computer-readable instructions for implementing any and all of the depicted functions.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

The elements depicted in flowchart illustrations and block diagrams throughout the figures imply logical boundaries between the elements. However, according to software or hardware engineering practices, the depicted elements and the functions thereof may be implemented as parts of a monolithic software structure, as standalone software modules, or as modules that employ external routines, code, services, and so forth, or any combination of these. All such implementations are within the scope of the present disclosure.

In view of the foregoing, it will now be appreciated that elements of the block diagrams and flowchart illustrations support combinations of means for performing the specified functions, combinations of steps for performing the specified functions, program instruction means for performing the specified functions, and so on.

It will be appreciated that computer program instructions may include computer executable code. A variety of languages for expressing computer program instructions are possible, including without limitation C, C++, Java, JavaScript, assembly language, Lisp, and so on. Such languages may include assembly languages, hardware description languages, database programming languages, functional programming languages, imperative programming languages, and so on. In some embodiments, computer program instructions can be stored, compiled, or interpreted to run on a computer, a programmable data processing apparatus, a heterogeneous combination of processors or processor architectures, and so on.

In some embodiments, a computer enables execution of computer program instructions including multiple programs or threads. The multiple programs or threads may be processed more or less simultaneously to enhance utilization of the processor and to facilitate substantially simultaneous functions. By way of implementation, any and all methods, program codes, program instructions, and the like described herein may be implemented in one or more thread. The thread can spawn other threads, which can themselves have assigned priorities associated with them. In some embodiments, a computer can process these threads based on priority or any other order based. In instructions provided in the program code.

Unless explicitly stated or otherwise clear from the context, the verbs "execute" and "process" are used interchangeably to indicate execute, process, interpret, compile, assemble, link, load, any and all combinations of the foregoing, or the like. Therefore, embodiments that execute or process computer program instructions, computer-executable code, or the like can suitably act upon the instructions or code in any and all of the ways just described.

The functions and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, embodiments of the invention are not described with reference to any particular programming language. It is appreciated that a variety of programming languages may be used to implement the present teachings as described herein, and any references to specific languages are provided for disclosure of enablement and best mode of embodiments of the invention. Embodiments of the invention are well suited to a wide variety of computer network systems over numerous topologies. Within this field, the configuration and management of large networks include storage devices and computers that are communicatively coupled to dissimilar computers and storage devices over a network, such as the Internet.

The functions, systems and methods herein described could be utilized and presented in a multitude of languages. Individual systems may be presented in one or more languages and the language may be changed with ease at any point in the process or methods described above. One of ordinary skill in the art would appreciate that there are numerous languages the system could be provided in, and embodiments of the present invention are contemplated for use with any language.

While multiple embodiments are disclosed, still other embodiments of the present invention will become apparent to those skilled in the art from this detailed description. The invention is capable of myriad modifications in various obvious aspects, all without departing from the spirit and scope of the present invention. Accordingly, the drawings and descriptions are to be regarded as illustrative in nature and not restrictive.

The invention claimed is:

1. A computerized method of determining and providing matches while facilitating interaction between users in an online dating application, the method comprising:

receiving a request from a first user to match with one or more other users, wherein the request comprises data related to the first user about one or more data points the first user is interested in that match data provided by the one or more other users;

generating one or more matches between first user and the one or more other users, wherein the one or matches are based at least in part on the data related to the first user and the data provided by the one or more other users;

receiving approval to match from the first user and a matched user selected from the one or more other users;

generating one or more interaction contents, wherein each one of the one or more interaction contents is based at least in part on matching data points between the data related to the first user and the data provided by the matched user and is specific to the matching data points;

determining that both the first user and the matched user are actively available for one to one matching by detecting that each user device is online and has indicated availability for a real-time match, and by triggering initiation of a pending one-to-one request when both are detected available;

initiating a real-time audio-only connection between the first user and the matched user for an initial predetermined duration, wherein the real-time audio-only connection allows the first user and the matched user to access a common digital space comprising a chat room with audio functionality;

analyzing audio data related to a conversation between the first user and the matched user;

identifying at least one of the first user or the matched user based on analysis of the audio data, wherein identifying at least one of the first user or the matched user comprises identifying ore or more voice tones associated with the audio data;

transmitting, during the real-time audio-only connection, one or more interaction contents to the first user and the matched user as part of a one to one real-time match process, wherein a conversation driver menu is provided, the conversation driver menu comprising one or more selectable menu driven categories each including a subset of the one or more interaction contents, and wherein, once a menu driven category of the one or more selectable menu driven categories is selected, a random question from the selected menu driven category is displayed on a first interactable user interface associated with the first user and a second interactable user interface associated with the matched user;

analyzing the one or more voice tones associated with the audio data to determine whether the first user or the matched user wish to extend the duration of the real-time connection or terminate the real-time connection, wherein the one or more voice tones includes one or more of laughs, raised voices, or tension;

automatically executing a real-time connection control action based on the one or more voice tones associated with the audio data, wherein executing the real-time connection control action comprises executing one or more of terminating the real-time connection, extending the real-time connection, and providing audio to one or more of the first user or the matched user;

wherein extending the real-time connection comprises:

determining, based on the one or more voice tones associated with the audio data, that the first user and the matched user may want to extend the duration of the real-time connection;

transmitting, based on detecting expiration of a threshold portion of the initial predetermined duration and the determination that the first user and the matched user wish to extend the duration of the real-time connection based on the one or more voice tones associated with the audio data, a prompt to both the first interactable user interface associated with the first user and the second interactable user interface associated with the matched user to extend a duration of the real-time connection between the first user and the matched user; and in response to both the first user and the matched user selecting to extend the duration of the real-time connection, automatically extending the duration of the real-time audio-only connection beyond the initial predetermined duration by adding additional time to the real-time audio-only connection.

2. The computerized method of claim 1, further comprising providing additional information to the first user and matched user based on approval by both first user and matched user to do so.

3. The computerized method of claim 1, wherein the one or more interaction contents includes one or more icebreaker contents.

4. The computerized method of claim 1, wherein the one or more interaction contents are first one or more interaction contents, the computerized method further comprising:

receiving, from an external source, second one or more interaction contents; and transmitting, during the real-time audio-only connection, both of the first one or more interaction contents and the second one or more interaction contents to the first user and the matched user.

5. A computerized system for determining and providing matches while facilitating interaction between users in an online dating application, the system comprising:

one or more hardware processors configured by machine readable instructions to:

receive a request from a first user to match with one or more other users, wherein the request comprises data related to the first user about one or more data points the first user is interested in that match data provided by the one or more other users;

generate one or more matches between first user and said-the one or more other users, wherein the one or matches are based at least in part on the data related to the first user and the data provided by the one or more other users;

receive approval to match from the first user and a matched user selected from the one or more other users;

generate one or more interaction contents, wherein each one of the one or more interaction contents is based at least in part on matching data points between the data related to the first user and the data provided by the matched user, and is specific to the matching data points;

determine that both the first user and the matched user are actively available for one to one matching by detecting that each user device is online and has indicated availability for a real-time match, and by triggering initiation of a pending one-to-one request when both are detected available;

initiate a real-time audio-only connection between the first user and the matched user for an initial predetermined duration, wherein the real-time audio-only connection allows the first user and the matched user to access a common digital space comprising a chat room with audio functionality;

analyze audio data related to a conversation between the first user and the matched user;

identify at least one of the first user or the matched user based on analysis of the audio data, wherein identifying at least one of the first user or the matched user comprises identifying ore or more voice tones associated with the audio data;

transmit, during the real-time audio-only connection, one or more interaction contents to the first user and the matched user as part of a one to one real-time match process, wherein a conversation driver menu is provided, the conversation driver menu comprising one or more selectable menu driven categories each including a subset of the one or more interaction contents, and wherein, once a menu driven category of the one or more selectable menu driven categories is selected, a random question from the selected menu driven category is displayed on a first interactable user interface associated with the first user and a second interactable user interface associated with the matched user;

analyze the one or more voice tones associated with the audio data to determine whether the first user or the matched user wish to extend the duration of the real-time connection or terminate the real-time connection, wherein the one or more voice tones includes one or more of laughs, raised voices, or tension;

automatically execute a real-time connection control action based on the one or more voice tones associated with the audio data, wherein executing the real-time connection control action comprises executing one or more of terminating the real-time connection, extending the real-time connection, and providing audio to one or more of the first user or the matched user;

wherein to extend the real-time connection, the one or more hardware processors are further configured by machine readable instructions to:

determine, based on the one or more voice tones associated with the audio data, that the first user and the matched user may want to extend the duration of the real-time connection;

transmit, based on detecting expiration of a threshold portion of the initial predetermined duration and the determination that the first user and the matched user wish to extend the duration of the real-time connection based on the one or more voice tones associated with the audio data, a prompt to both the first interactable user interface associated with the first user and the second interactable user interface associated with the matched user to extend a duration of the real-time connection between the first user and the matched user; and in response to both the first user and the matched user selecting to extend the duration of the real-time connection, automatically extend the duration of the real-time audio-only connection beyond the initial predetermined duration by adding additional time to the real-time audio-only connection.

6. The computerized system of claim 5, wherein the one or more hardware processors are further configured by machine readable instructions to provide additional information to the first user and matched user based on approval by both first user and matched user to do so.

7. The computerized system of claim 5 wherein the one or more interaction contents include one or more icebreaker contents.

8. The computerized system of claim 5, wherein the one or more interaction contents are first one or more interaction contents, wherein the one or more hardware processors are further configured by machine readable instructions to:

receive, from an external source, second one or more interaction contents; and transmit, during the real-time audio-only connection, both of the first one or more interaction contents and the second one or more interaction contents to the first user and the matched user.

* * * * *